Oct. 13, 1970   S. V. GALGINAITIS   3,534,354
DISCHARGE INDICATOR FOR RECHARGEABLE BATTERIES
Filed July 1, 1966
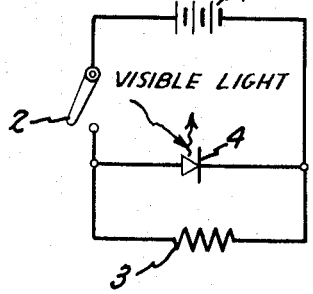
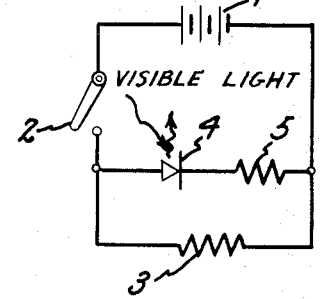
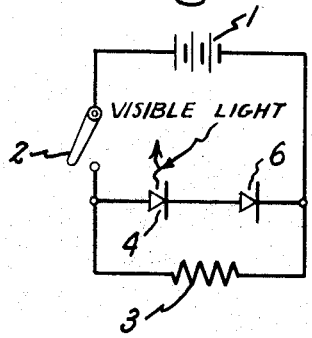
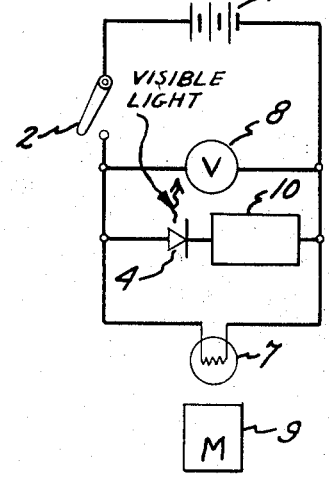
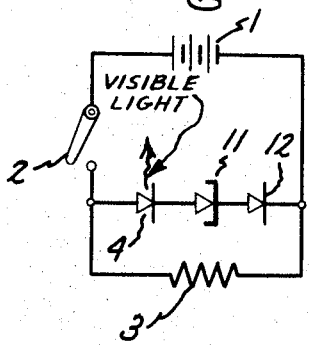
Inventor:
Simeon V. Galginaitis,
by Edward D. Murphy
His Attorney.

United States Patent Office 3,534,354
Patented Oct. 13, 1970

3,534,354
DISCHARGE INDICATOR FOR RECHARGEABLE BATTERIES
Simeon V. Galginaitis, Schenectady, N.Y., assignor to General Electric Company, a corporation of New York
Filed July 1, 1966, Ser. No. 562,156
Int. Cl. G08b 21/00; G01r 19/14
U.S. Cl. 340—249                                                1 Claim

ABSTRACT OF THE DISCLOSURE

In a rechargeable battery system, means are provided for providing a visible indication of the discharge of the rechargeable batteries to a voltage level at which the batteries should be recharged and includes a visible light-emitting semiconductor diode coupled in parallel with the battery and adapted to show a visible indication of the occurrence of the predetermined low voltage level.

---

The present invention relates to an indicator for signaling excessive discharge of rechargeable batteries to protect against the possibility of permanent damage.

Rechargeable batteries usually of the nickel-cadmium type, are currently being used extensively in many varieties of home appliances. In many of these applications, it is likely that the appliance, after being used, may not be replaced in the socket to recharge the battery for subsequent use. The batteries may therefore be discharged to an extremely low level. When two or more interconnected nickel-cadmium cells are discharged, small differences in the capacity of individual cells may cause one cell to reach complete discharge sooner than the others. The higher terminal potential difference of these other cells then causes current to flow through the completely discharged cell, causing over-discharge and reversal of the electrode polarity. The battery then reaches a condition from which it cannot recover.

It has previously been attempted to overcome this difficulty by providing a shunt diode across each cell so that any current caused by the lower terminal potential difference of one cell is shunted through the diode. However, this system is comparatively expensive since a separate diode is required for each cell and furthermore, no warning or indicating means is provided for alerting the user of the situation. A second device which has been attempted is the provision of a small incandescent light connected across the battery as a monitor, recharging being required when "the light becomes dim." Since the light output of an incandescent bulb is a monotonically decreasing function of the available potential difference, the choice of "dim" is arbitrary and inexact.

It is accordingly an object of the present invention to provide a new and improved discharge indicator for rechargeable batteries.

A further object of the present invention is the provision of means for protecting a rechargeable battery comprising a plurality of nickel-cadmium cells against discharge by indicating a need for recharging to the user.

A further object of this invention is the provision of a new and improved visible indicator for indicating discharge of rechargeable batteries.

It is also an object of this invention to provide a visible discharge indicator for rechargeable batteries which operates in an "on-or-off" mode.

Briefly, in accord with one embodiment of this invention, I provide, in combination, a rechargeable battery comprising a plurality of individual cells, which may be subject to damage upon excessive discharge, a load coupled to the battery and a light emitting diode for indicating the condition of the battery output. The diode may be used either alone or in further combination with additional circuitry for controlling the point at which a positive indication is made. The diode and the additional circuit elements, if any, are connected in series and the combination is coupled in parallel across the rechargeable battery so that the light-emitting diode is either normally on and switched off when a battery needs recharging or is normally off and switches on when the battery needs recharging. In a specific preferred embodiment, a gallium phosphide light-emitting diode, a tunnel diode and a rectifying diode are placed in series with each other and in parallel across a rechargeable battery. This is a normally off system in which the light-emitting diode turns on when the voltage of the battery reaches a predetermined low value.

The novel features believed characteristic of the invention are set forth in the appended claim. The invention itself, together with further objects and advantages thereof may best be understood by reference to the following description taken in connection with the appended drawings in which:

FIG. 1 is a schematic illustration of a circuit embodying the present invention;

FIGS. 2 and 3 schematically illustrate alternative bodiments of this invention;

FIG. 4 is a schematic illustration of test apparatus used to determine the operating parameters for the circuits of FIGS. 1–3, and FIG. 5 is a schematic illustration of an alternative embodiment of this invention.

In general, consumer appliances which utilize rechargeable batteries are necessarily designed to operate satisfactorily as the voltage of the battery drops from its initial, fully charged level during use. As a result, if the appliance is used for an excessive period without recharging, the user does not notice any deterioration in the appliance operation until the battery output has reached a rate of fade so fast that the appliance output cannot give sufficient advance warning. In accord with the present invention, I provide a light-emitting diode connected in parallel with the rechargeable battery and mounted in a convenient location so that it can be checked prior to or during use. The diode may be arranged so that the output thereof reduces in brightness or, preferably, so that it is turned either on or off at a level of voltage which provides adequate warning of the need for recharging. In the former case, actual turn-off of the diode might be set to indicate the need for replacement of a non-rechargeable battery.

The circuit shown in FIG. 1 illustrates schematically one embodiment of the present invention. This circuit includes a rechargeable battery 1, an on-off switch 2 and a load 3 which represents the appliance and may comprise an electric toothbrush, knife, etc. In accord with the present invention a light-emitting diode 4 is connected in parallel with the rechargeable battery. In the illustration, the diode is connected after the on-off switch so as to avoid continuous drain on the battery; however, the power used by such diodes is slight and the diode may be connected directly across the battery if desired. The light-emitting diode may comprise any suitable electroluminescent device which produces visible radiation when a sufficient voltage is applied to it. For example, a crystal of gallium phosphide suitably doped with impurities to provide p and n-type regions may be used since the voltage level of this material is suitable for many applications and the output radiation lies well within the visible spectrum.

In the embodiment illustrated, assuming an appropriate match between the voltage level at which the battery should be recharged and the voltage at which the diode turns off, the diode will emit light whenever switch 2 is turned on and the battery has a sufficient charge. Thus, the user has a constant visible indication that the device can be operated without damage to the battery. Preferably, the voltage match is such that the diode turns completely off at such a level of battery voltage as to give adequate warning; however, light-emitting diodes undergo a noticeable reduction in brightness prior to reaching the turn-off voltage and, if desired, the reduction in brightness of the diode may be set at the adequate warning level.

FIG. 2 illustrates a circuit similar to FIG. 1 except that a voltage attenuating element comprising a resistor 5 has been added in series with the light-emitting diode 4; this embodiment is useful where the output voltage of the battery ranges above the normal operating level of the diode. The resistor 5 and diode 4 form a voltage divider so that the diode is subjected to a voltage proportional to the output of the battery. The proportion is adjusted so that the diode turns off when the battery output is reduced to the level where recharging is desired.

FIG. 3 illustrates a further embodiment wherein a conventional diode 6, for example, comprising a germanium crystal having appropriate n and p-type regions, is provided in series with the light-emitting diode 4. This diode pair also forms a voltage divider network and functions in a manner similar to FIG. 2. It may be preferred to use the rectifying diode 6 in place of the resistor 5. The sharp current-voltage characteristic of a diode reduces the time duration of the interval of low current before the light-emitting diode is turned off and thus produces a sharper, more noticeable transition from "on" to "off." A diode also has the effect of increasing slightly the value of voltage at which the light-emitting diode turns off.

To further illustrate the advantages of the present invention, the system illustrated in FIG. 4 has been used to determine the operational parameters in a particular system. The appliance tested was a flashlight comprising a rechargeable battery 1 and a bulb 7. A voltmeter 8 was provided to monitor the output potential of the battery 1 and a light meter 9 was provided to monitor the output of the light bulb 7. A light-emitting diode was connected in parallel with the battery. The block 10 represents schematically a location for any additional elements which may be connected in series with the diode 4.

It was first determined that visual observation of flashlight brightness was not sufficient to warn of excessive discharge since, even when the light meter indicated that the light output was down to 1/3 of its initial value, the flashlight was still usable; however, at this time, the battery was fading so fast that excessive discharge followed almost immediately. It was determined that the battery, specifically comprising two nickel-cadmium cells converted in series, should be recharged when the potential output had dropped from an initial level of 2.7 volts to about 2.1 volts; this corresponded to a light output of about 50% of the initial value. The following table summarizes the measurements made during several test runs. As indicated in the first column, the monitors used were those illustrated in FIGS. 1, 2 and 3; that is, the block 10 included, respectively, a short circuit, a 20 ohm resistor and a germanium diode. In each case, the light-emitting diode used was a gallium phosphide crystal including a p-n junction.

The second column of the above table represents the voltage at which the diode output had unquestionably been reduced from its initial level and the third column represents the time remaining from that point to the 50% output level, the point at which recharging was desirable. The fourth column represents the voltage at which the diode turned completely off while the fifth column represents the time interval between diode turnoff and the 50% output point. This table illustrates, for the case of the particular device and battery tested, that the monitor circuits of FIG. 1 and FIG. 2, using respectively a light-emitting diode and a light-emitting diode in series with a small resistor, provide adequate warning of the desired time for recharging only if the dimming of diode output is taken as the warning signal. In this particular case, the circuit of FIG. 2 provides a nearly adequate warning since diode turn-off occurred only 3 minutes after the 50% output level. However, the preferred monitor is that of FIG. 3 since, with this circuit, the diode actually turned off 6 minutes prior to the desired recharging time, thus providing an adequate safety margin.

In some situations, it may be desirable to maintain the light-emitting diode in the off condition when the battery is properly charged and have it turned on as a warning when the battery needs recharging. This mode of operation can be achieved by means of the circuit illustrated in FIG. 5 which comprises, in addition to the elements previously identified, a tunnel diode 11, for example, of gallium arsenide, connected in series with the light-emitting diode. A conventional diode 12 may also be placed in series with this combination if it is desired to provide a sharp transition from "off" to "on" and to raise the voltage level at which the light-emitting diode turns "on." In this system, the negative characteristic region of tunnel diode operation functions to reverse the effect of the battery voltage by providing a region in which the current increases with decreasing voltage. Thus, when the battery is properly charged, the tunnel diode maintains the current at a low level and the light-emitting diode is off. When the battery voltage is reduced to a predetermined level, the current increases and the light-emitting diode turns on. For example, in a particular situation utilizing this circuit, the light-emitting diode remained off while the voltage of a source was reduced from 2.7 volts to a level of 2.5 volts, at which time the light-emitting diode turned on.

In this circuit, if the voltage is so high that the tunnel diode is operated in the conventional characteristic region and permits a sufficient current to flow, the light-emitting diode will turn on at a low level of brightness, thus also providing an indication of overcharge. It is noted that this indication will not be confused with the indication of battery discharge since the overcharge indication is very dim while the discharge indication is much brighter and becomes dim only when the battery output is extremely weak. Then, the operation of the appliance is very noticeably effected and it can therefore be readily distinguished from the overcharge indication.

While I have shown and described several embodiments of my invention, it will be apparent to those skilled in the art that many changes and modifications may be made without departing from my invention in its broader aspects.

What I claim as new and desire to secure by Letters Patent of the United States is:

1. In combination, a rechargeable battery having a plurality of cells; a load coupled to said battery; and means for monitoring the output of said battery comprising a visible light-emitting semiconductor diode coupled in parallel with said battery for indicating a predetermined battery voltage at which said battery should be charged to avoid irreversible discharge thereof, said monitor means comprising a tunnel diode connected in series with said visible light-emitting diode to maintain said light-emitting

| Monitor circuit | Voltage at which diode became unambiguously dim | Time from dim point to 50% output point, min. | Voltage at which diode turned off | Time from off point to 50% output point, min. |
|---|---|---|---|---|
| Figure 1 | 2.35 | 12 | 1.93 | −13 |
| Figure 2 | 2.35 | 12 | 2.0 | −3 |
| Figure 3 | 2.4 | 50 | 2.2 | 6 | diode in an "off" condition when said battery is above said predetermined voltage.

References Cited
UNITED STATES PATENTS

| | | |
|---|---|---|
| 1,762,712 | 6/1930 | Charlton. |
| 3,243,795 | 3/1966 | O'Brien _____ 340—249 |
| 3,346,811 | 10/1967 | Perry et al. _____ 324—96 |
| 2,624,033 | 12/1952 | Jacquier. |
| 3,315,176 | 4/1967 | Biard. |
| 3,333,135 | 7/1967 | Galginaitis. |
| 3,343,058 | 9/1967 | DesChamps et al.____ 320—25 XR |
| 3,366,819 | 1/1968 | Crowder et al. |

FOREIGN PATENTS

| | | |
|---|---|---|
| 618,101 | 2/1949 | Great Britain. |
| 559,513 | 2/1944 | Great Britain. |

OTHER REFERENCES

Philco Technical Note #6; "Solid-State Light Emitting Diode, Philco GAE–402"; November 1962.

THOMAS B. HABECKER, Primary Examiner

D. MYER, Assistant Examiner

U.S. Cl. X.R.

307—235; 324—133; 313—108; 315—135; 320—48